(12) United States Patent
Wei et al.

(10) Patent No.: US 7,580,974 B2
(45) Date of Patent: Aug. 25, 2009

(54) SYSTEMS AND METHODS FOR CONTENT TYPE CLASSIFICATION

(75) Inventors: Shaohong Wei, Sunnyvale, CA (US); Zhongqiang Chen, Falcon Avenue, CA (US); Ping Ng, Milpitas, CA (US); Gang Duan, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 457 days.

(21) Appl. No.: 11/357,654

(22) Filed: Feb. 16, 2006

(65) Prior Publication Data

US 2007/0192481 A1 Aug. 16, 2007

(51) Int. Cl.
*H04L 12/28* (2006.01)

(52) U.S. Cl. .................. 709/203; 709/227; 370/230; 370/392

(58) Field of Classification Search .............. 709/228, 709/230, 203, 227, 232; 370/230, 260, 392, 370/401
See application file for complete search history.

(56) References Cited

U.S. PATENT DOCUMENTS

| | | | | |
|---|---|---|---|---|
| 6,157,955 | A * | 12/2000 | Narad et al. .............. | 709/228 |
| 6,665,725 | B1 * | 12/2003 | Dietz et al. .............. | 709/230 |
| 7,095,715 | B2 * | 8/2006 | Buckman et al. ............ | 370/230 |
| 2003/0012147 | A1 * | 1/2003 | Buckman et al. ............ | 370/260 |
| 2006/0239273 | A1 * | 10/2006 | Buckman et al. ....... | 370/395.41 |

* cited by examiner

*Primary Examiner*—Khanh Q Dinh
(74) *Attorney, Agent, or Firm*—Schwegman, Lundberg & Woessner, P.A.

(57) ABSTRACT

A method for determining a type of content includes receiving a first packet, determining a state of classification for the first packet or for a session with which the first packet is associated, receiving a second packet, and determining a content type for the second packet based at least in part on the determined state. A method for determining a type of content includes receiving a packet associated with a session, determining whether a content type has been determined for the session or for an other packet associated with the session, and classifying the packet to be the content type based at least in part on a result from the act of determining. A method for determining a type of content includes receiving a first packet from a first port, the first port adapted for receiving at least two types of content, and determining a content type for the first packet or for a session with which the first packet is associated. A method for determining a type of content includes receiving a packet associated with a session, and determining a state of classification for the packet or the session.

6 Claims, 7 Drawing Sheets

Example 1: TCP traffic

| # | direction | packet_size | port | using proxy | (p,s) matchs skype |
|---|---|---|---|---|---|
| 1 | C --> S | 14 | 180/1443 | no | unknown |
| 2 | S --> C | 28-36 | 180/1443 | no | unknown |
| 3 | C --> S | 14 | 180/1443 | no | Yes (confirm) |

*FIG. 3A*

Example 2: TCP traffic

| # | direction | packet_size | port | using proxy | (p,s) matchs skype |
|---|---|---|---|---|---|
| 1 | C --> S | 16 | 80 | no | unknown |
| 2 | S --> C | 14 | 80 | no | unknown |
| 3 | C --> S | 28-36 | 80 | no | unknown |
| 4 | S --> C | 14 | 80 | no | Yes |

*FIG. 3B*

Example 3: TCP traffic

| # | direction | packet_size | port | using proxy | pattern | (p,s) matchs skype |
|---|---|---|---|---|---|---|
| 1 | C --> S | 72 | 443 | no | \|80 46 01 03 01 00 2d\| | unknown |
| 2 | S --> C | 93 | 443 | no | \|16 03 01 00 4a 02\| | unknown |
| 3 | C --> S | 14 | 443 | no | N/A | yes (confirm) |

*FIG. 3C*

Example 4: UDP traffic:
```
# direction  packet_size  port   pattern(3rd byte)  (p,s) matchs skype
1  C --> S    18/27       >1024   0x02               unknown
2  S --> C    >10         >1024   0x02/0x07          yes
```

FIG. 3D

Example 5: normal Yahoo login, through port 80
protocol: TCP; client (C): 192.168.5.186:1734; server (S): 216.155.193.142:80)
```
# direction  pattern                         classifier(p,s, yahoo)
1  C --> S   |YMSG| + ver_number             session is Yahoo! candidate
             + pkt_len test                  However, without server_side
                                             packet, the classifier
                                             returns "unknown"
2  S --> C   |YMSG| + ver_num                Confirmed. The content type
                                             is marked as Yahoo!
```

FIG. 3E

Example 6: (fragment packet, through http proxy 192.168.5.158:8007)
protocol: TCP; client (C): 192.168.5.186:40324; server (S): 192.168.5.158:8007)

| # | direction | pattern | classifier(p,s, yahoo) |
|---|---|---|---|
| 1 | C --> S | \|POST\| + \|YMSG\| + ver_num + pkt_len test | session is Yahoo! candidate However, without server_side packet, the classifier returns "unknown" |
| 2 | S --> C | \|HTTP/1.0 200 OK\| | Get proxy server reply. Classifier returns "unknown". Waiting for the next server packet. |
| 3 | S --> C | \|YMSG\| + ver_num + pkt_len test | Confirmed. The content type is marked as Yahoo! |

*FIG. 3F*

Example 7: (using sock5 server: 192.168.5.158:1080)
protocol: TCP; client (C): 192.168.5.186:39594; server (S): 192.168.5.158:1080)

| # | direction | pkt_size | pattern | classifier(p,s, msn) |
|---|---|---|---|---|
| 1 | C --> S | 4 | \|05 02 00 02\| | session is Socks5, classifier return "unknown" |
| 2 | S --> C | 2 | \|05 00\| | Socks reply, no auth, classifier return "unknown", wait for real data |
| 3 | C --> S | >10 | \|05 01 00 03\| | Socks5 connection require, classifier return "unknonwn", wait for real data |
| 4 | S --> C | 10 | \|05 00 00 01\| | Socks5 connection success return "unknown", wait for real data. |
| 5 | C --> S | >16 | msn command | MSN candidate, classifier return "unknown", wait for server reply |
| 6 | S --> C | N/A | msn command | session confirmed, session's content type is marked as "MSN" |

*FIG. 3G*

Example 8: For UDP Tracker protocol 1
protocol: UDP; client (C): 192.168.5.186:7934; server (S): 218.83.154.39:8080)

| # | direction | pattern | classifier(p,s, Bittorrent) |
|---|---|---|---|
| 1 | P1 --> P2 | 0x0041727101980L | session is Bittorrent candidate. However, without peer packet, the classifier will return "unknown" and wait for the server packet to confirm. |
| 2 | P2 --> P1 | Test Packet len | If match length requirement. The Classifier will return "YES". The content type will be marked as Bittorrent |

*FIG. 3H*

Example 9: protocol: UDP; client (C): 192.168.5.186:1837; server (S): 66.75.54.201:1182;
First Packet (c --> s)

| # | direction | pkt_size | pattern | classifier(p,s, KaZaA) |
|---|---|---|---|---|
| 1 | P1 --> P2 | 12 | \|27 00 00 00\| + enc_type check + net-workname( "KaZaA") | KaZaA candidate, return "unknonw", waiting for peer reply for confirm. |
| 2 | P2 --> P1 | n/a | \|28 00 00 00\| + enc_type check + network-name ( "KaZaA") | Get pong reply from peer session confirmed. return "YES". session marked as content type KaZaA | note: enc_type coulde be \xa9, \x29,\xbf etc.

*FIG. 3I*

| TIME | SESSION S1 | | SESSION S1 | |
|---|---|---|---|---|
| ↓ | P11 | STATE UNKNOWN (T1, T2, T3) | P21 | STATE CLASSIFIED (T2) |
| | P12 | STATE UNKNOWN (T1, T3) | P22 | STATE CLASSIFIED (T2) |
| | P13 | STATE CLASSIFIED (T3) | P23 | STATE CLASSIFIED (T2) |
| | P14 | STATE CLASSIFIED (T3) | | |
| | P15 | STATE CLASSIFIED (T3) | | |

SYSTEMS AND METHODS FOR CONTENT TYPE CLASSIFICATION

FIELD

The field of the invention relates to computer systems and computer networks, and more particularly, to systems and methods for classifying content of computer and network traffic.

BACKGROUND

Many data processing systems require a content type of data to be determined before the data can be further processed. For example, in malicious content detection systems, such as anti-virus systems and anti-spam systems, a received data generally needs to be classified before it can be scanned for malicious content. Intrusion detection/prevention systems, application-based traffic shaping devices or load balancers, IM proxies, and application accelerators may also require data to be classified. If the data is classified to be a skype data, then a content detection module may apply a set of algorithms to scan the data for malicious content. On the other hand, if the data is classified to be a bittorrent data, then the content detection module may apply a different set of algorithms to scan the data for malicious content. As such, determining content type of data is an important step before the data is scanned.

Existing systems determine content type by using port number of a port at which data is transmitted. For example, well-known port for HTTP protocol is "80," well-known port for SMTP protocol is "25," and well-known port for POP3 protocol is "110." In such systems, data belonging to a certain type is transmitted to a dedicated port. As such, by determining the port number of the port at which data is transmitted, and knowing the content type that is associated with the port number, a system can determine the content type for the data. However, use of a port to transmit only one type of data is restrictive. Sometimes, it may be desirable to allow a port to transmit more than one type of data. Existing systems do not allow a content type to be determined if data is transmitted through a port that is not data type specific (i.e., port that is allowed to transmit more than one type of data).

Also, some type of data, such as IM data and P2P data, may not go to any specific port, and can be transmitted through different ports. In such cases, existing systems may not be able to classify IM data and P2P data using port number.

SUMMARY

In accordance with some embodiments, a method for determining a type of content includes receiving a first packet, determining a state of classification for the first packet or for a session with which the first packet is associated, receiving a second packet, and determining a content type for the second packet based at least in part on the determined state. As used in this specification, the term "first packet" refers to any one of the packets in a session (e.g., it can be the first, second, third, fourth, etc. packet in a session), and does not necessarily mean the very first packet in a session (although it could be used to refer to the very first packet in a session). Similarly, as used in this specification, the term "second packet" refers to any one of the packets in a session (e.g., it can be the first, second, third, fourth, etc. packet in a session) that is different from the first packet.

In accordance with other embodiments, a computer product includes a computer-readable medium, the computer-readable medium having a set of stored instructions, an execution of which causes a process to be performed, the process includes receiving a first packet, determining a state of classification for the first packet or for a session with which the first packet is associated, receiving a second packet, and determining a content type for the second packet based at least in part on the determined state.

In accordance with other embodiments, a system for determining a type of content includes means for receiving a first packet and a second packet, means for determining a state of classification for the first packet or for a session with which the first packet is associated, and means for determining a content type for the second packet based at least in part on the determined state.

In accordance with other embodiments, a method for determining a type of content includes receiving a packet associated with a session, determining whether a content type has been determined for the session or for an other packet associated with the session, and classifying the packet to be the content type based at least in part on a result from the act of determining.

In accordance with other embodiments, a computer product includes a computer-readable medium, the computer-readable medium having a set of stored instructions, an execution of which causes a process to be performed, the process includes receiving a packet associated with a session, determining whether a content type has been determined for the session or for an other packet associated with the session, and classifying the packet to be the content type based at least in part on a result from the act of determining.

In accordance with other embodiments, a system for determining a type of content includes means for receiving a packet associated with a session, means for determining whether a content type has been determined for the session or for an other packet associated with the session, and means for classifying the packet to be the content type based at least in part on a result from the act of determining.

In accordance with other embodiments, a method for determining a type of content includes receiving a first packet from a first port, the first port adapted for receiving at least two types of content, and determining a content type for the first packet or for a session with which the first packet is associated.

In accordance with other embodiments, a computer product includes a computer-readable medium, the computer-readable medium having a set of stored instructions, an execution of which causes a process to be performed, the process includes receiving a first packet from a first port, the first port adapted for receiving at least two types of content, and determining a content type for the first packet or for a session with which the first packet is associated.

In accordance with other embodiments, a system for determining a type of content includes means for receiving a first packet from a first port, the first port adapted for receiving at least two types of content, and means for determining a content type for the first packet or for a session with which the first packet is associated.

In accordance with other embodiments, a method for determining a type of content includes receiving a packet associated with a session, and determining a state of classification for the packet or the session.

In accordance with other embodiments, a computer product includes a computer-readable medium, the computer-readable medium having a set of stored instructions, an execution of which causes a process to be performed, the process includes receiving a packet associated with a session, and determining a state of classification for the packet or the session.

In accordance with other embodiments, a system for determining a type of content includes means for receiving a packet associated with a session, and means for determining a state of classification for the packet or the session.

Other aspects and features will be evident from reading the following detailed description of the preferred embodiments, which are intended to illustrate, not limit, the invention.

BRIEF DESCRIPTION OF THE DRAWINGS

The drawings illustrate the design and utility of various embodiments, in which similar elements are referred to by common reference numerals. More particular descriptions will be rendered by reference to specific embodiments, which are illustrated in the accompanying drawings. Understanding that these drawings are not to be considered limiting in scope, the embodiments will be described and explained with additional specificity and detail through the use of the accompanying figures.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments, and are not intended as an exhaustive description of the invention, or as a limitation on the scope of the invention. In addition, an illustrated embodiment need not have all the aspects or advantages of the invention shown. An aspect or an advantage described in conjunction with a particular embodiment is not necessarily limited to that embodiment and can be practiced in any other embodiments even if not so illustrated.

Figure 1:
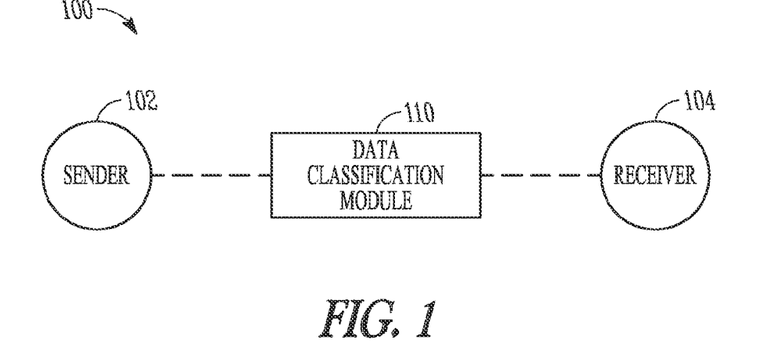
FIG. 1 illustrates a block diagram representing a system that includes a module for classifying data in accordance with some embodiments.

FIG. 1 illustrates a block diagram of a system 100, which includes a data classification module 110 for classifying data into content type in accordance with some embodiments. Sender 102 transmits data associated with network traffic content to module 110. Module 110 receives the transmitted data, determines a type of content to which the network traffic data belongs (i.e., classifies the data), and causes a result, such as a message, to be sent to a receiver 104. The message sent to receiver 104 notifies the receiver 104 that the received data belongs to a content type. As used in this specification, the term "receiver" should not be limited to a human receiver, and can include a server or other types of devices that can receive information. For example, in some embodiments, the receiver 104 can be a malicious content detection module, such as an anti-virus module, which detects malicious content based on a content type as determined by the module 110. Also, as used in this specification, the term "sender" should not be limited to a human sender, and can include a server or other types of devices that can transmit information.

In some embodiments, module 110 can be implemented using software. For example, module 110 can be implemented using software that is loaded onto a user's computer, a server, or other types of memory, such as a disk or a CD-ROM. In some cases, module 110 can be implemented as web applications. In alternative embodiments, module 110 can be implemented using hardware. For example, in some embodiments, module 110 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In other embodiments, module 110 can also be any of a variety of circuits or devices that are capable of performing the functions described herein. For example, in alternative embodiments, module 110 can include a general purpose processor, such as a Pentium processor. In other embodiments, module 110 can be implemented using a combination of software and hardware. In some embodiments, module 110 may be implemented as a firewall, a component of a firewall, or a component that is configured to be coupled to a firewall.

Figure 2:
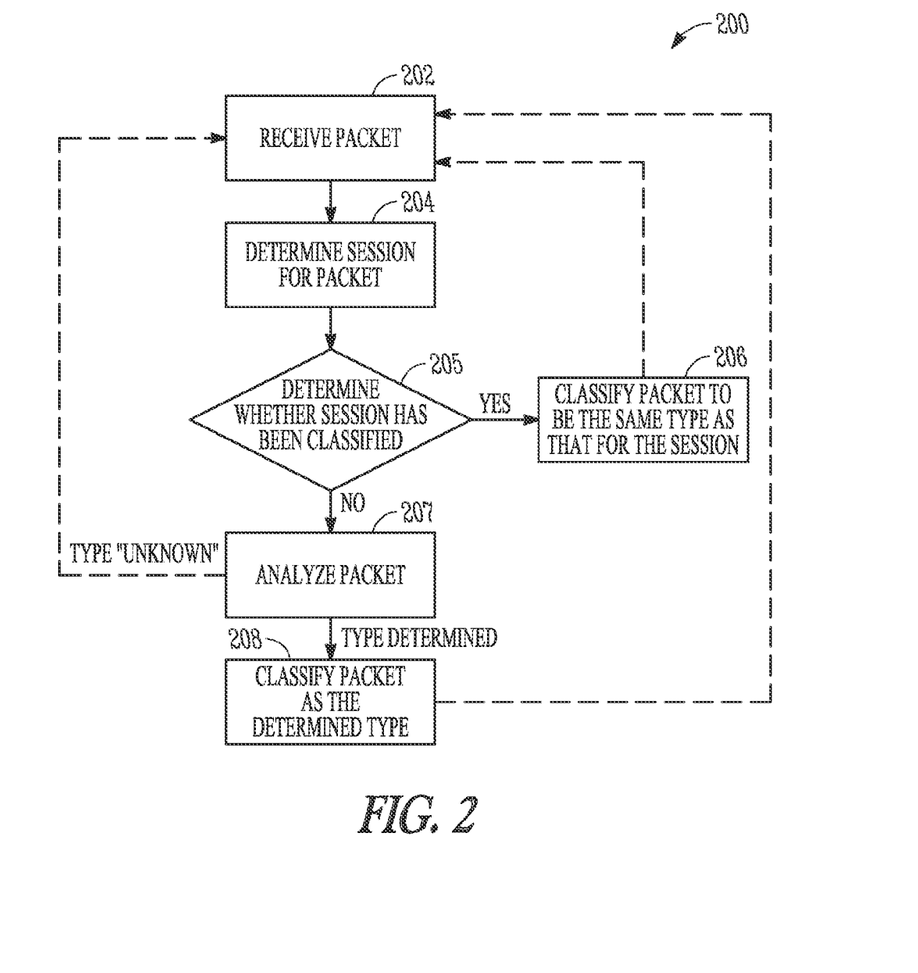
FIG. 2 illustrates a method for classifying data in accordance with some embodiments.

FIG. 2 illustrates a method 200 for classifying data in accordance with some embodiments. First, module 110 receives network traffic data in a form of a packet (Step 202). Next, module 110 determines a session S for the received packet (Step 204). A session is an interaction or a series of interactions between two communication end points. Various techniques may be used to determine a session. For example, module 110 can be configured to determine one or more of a source IP address, a destination IP address, a source port, a destination port, and a protocol, to thereby determine a session S for the received packet. Techniques for determining a session are known in the art, and will not be described in details.

Next, module 110 determines whether a content type has already been determined for the session S (and therefore, for the packet associated with the session S) (Step 205). In the illustrated embodiments, each session (e.g., session S) being processed by module 110 is automatically assigned an initial state of classification, "unknown" (i.e., the content type is initially determined as "unknown"). In such cases, in step 205, module 110 determines whether a content type other than "unknown" has been determined for session S. If a content type other than "unknown" type has already been determined for the session S, then module 110 classifies the packet to be the same type as that for the classified session S, and the method returns to step 202 to process additional packet, if any (Step 206). In some embodiments, the classifying of the packet (determining the content type for the packet) may be implemented by associating the packet with the classified session S.

On the other hand, if a content type (other than "unknown" type) has not been previously determined for the session S, module 110 then analyzes the received packet to attempt to determine a content type (Step 207). If a content type (other than "unknown" type) is determined for the received packet, module 110 then classifies the received packet (or its associated session S) as having the determined content type (Step 208). If there is an additional packet, module 110 then receives the additional packet, and repeats the process 200 to process the additional packet.

Alternatively, if after step 207, the content type remains "unknown" (e.g., because the analysis of the packet provides an inconclusive result), then module 110 receives additional packet that is associated with the same session S, and analyzes the additional packet to attempt to determine a content type for data being transmitted in the session S (repeating Steps 202-207, or Steps 202 and 207), until a content type other than "unknown" is determined for the session S.

As shown in the above embodiments, module 110 receives packet(s) in step 202, analyzes the packet(s) in step 207, and repeats these two steps until it determines a content type for the session in which the packet(s) is being transmitted. Examples of content type that may be determined by module 110 includes skype, gnutella, kazaa, edonkey, bittorrent, aim, yahoo, msn, icq, qq, http, smtp, pop3, imap, ftp, bo2k, bo, tfn, tfn2k, ldap, radius, ms, rpc, snmp, mssql, mysql, and oracle. Various techniques may be used to analyze received packet(s) to determine a content type for the packet(s) being transmitted in a session. For example, module 110 may be configured to examine one or more characteristics of a packet, such as a packet size, a port number of a port from which the packet is received, whether a proxy is used to transmit the packet, a direction in which the packet travels (e.g., from client to server, or from server to client), a string pattern, order of packets, and/or other protocol characteristics.

Figure 3A:
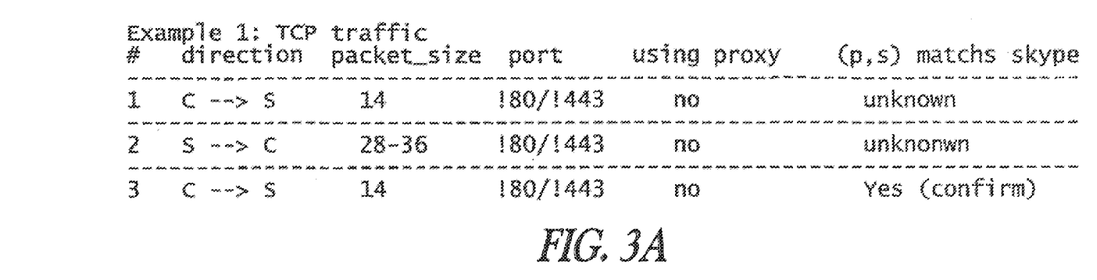
FIGS. 3A-3I illustrate examples of criteria that may be used to determine content type in accordance with some embodiments.

Several examples of techniques for analyzing packets to determine content type will now be discussed. However, it should be understood that module 110 is not limited to using the examples of techniques described herein, and that module 110 can use other algorithms, techniques, and criteria to perform the functions described herein. FIG. 3A illustrates an example of criteria that may be used to determine whether data transmitted at a normal port is skype data. As shown in the example, module 110 is configured to examine the first packet that is transmitted from client to server, and determine whether the first packet has a prescribed packet size (in the example, prescribed packet size=14). If the payload size matches the prescribed packet size, then module 110 determines that the session is a candidate of skype type. However, module 110 still classifies the session as "unknown" because the result is inconclusive. The module 110 then determines the payload size of a second packet from server to client, and determines whether the size satisfies the prescribed criteria (in the example, the prescribed size criteria is 28-36). If there is no match (i.e., the size of the second packet does not match the prescribed size criteria), then module 110 determines that the session is not a skype type, and any further packets received in the same session would not be considered as a skype type. However, if there is a match, the module 110 still determines that the session is a candidate of skype type, and maintains the state of classification as "unknown."

Module 110 next determines the payload size of a third packet from client to server, and determines whether the packet size matches the prescribed size criteria (in the example, the prescribed size criteria=14). If there is a match, then module 110 determines that data transmitted in the session are skype data.

Figure 3B:
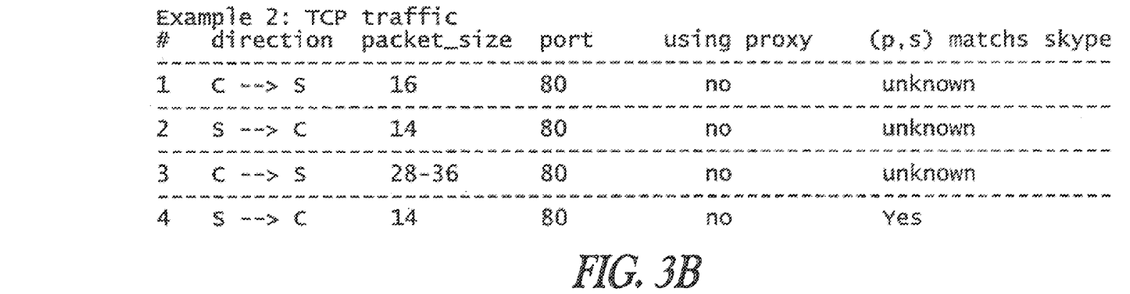
Figure 3C:
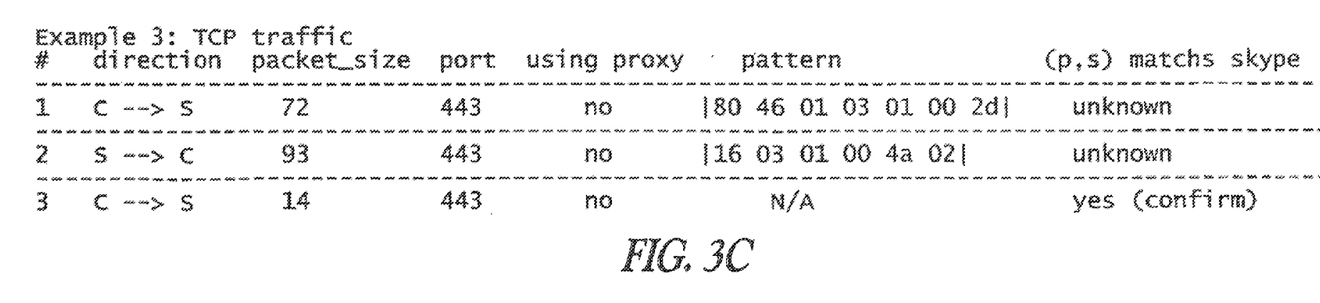
Figure 3D:
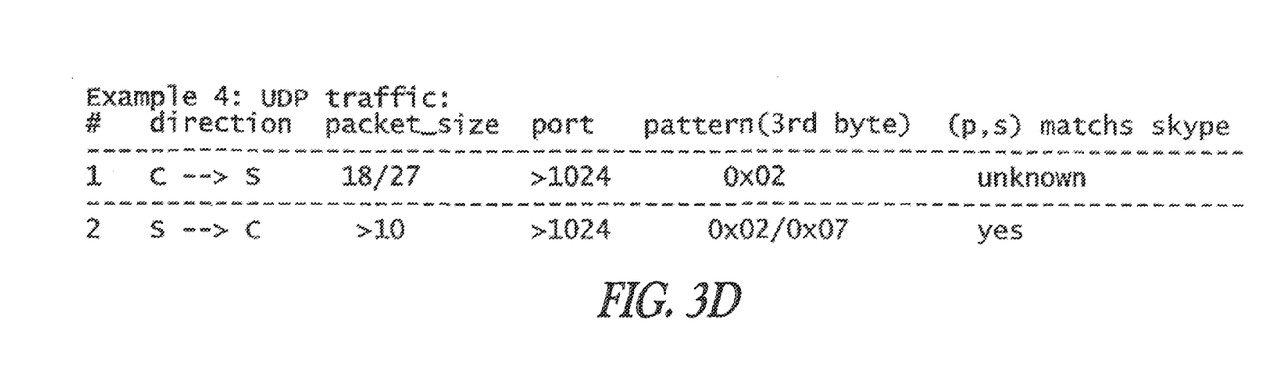

FIG. 3B illustrates an example of criteria that may be used to determine whether data transmitted at a http port is skype data. FIG. 3C illustrates an example of criteria that may be used to determine whether data transmitted at a ssl port is skype data. FIG. 3D illustrates an example of criteria that may be used to determine whether UDP traffic data is skype data.

Figure 3E:
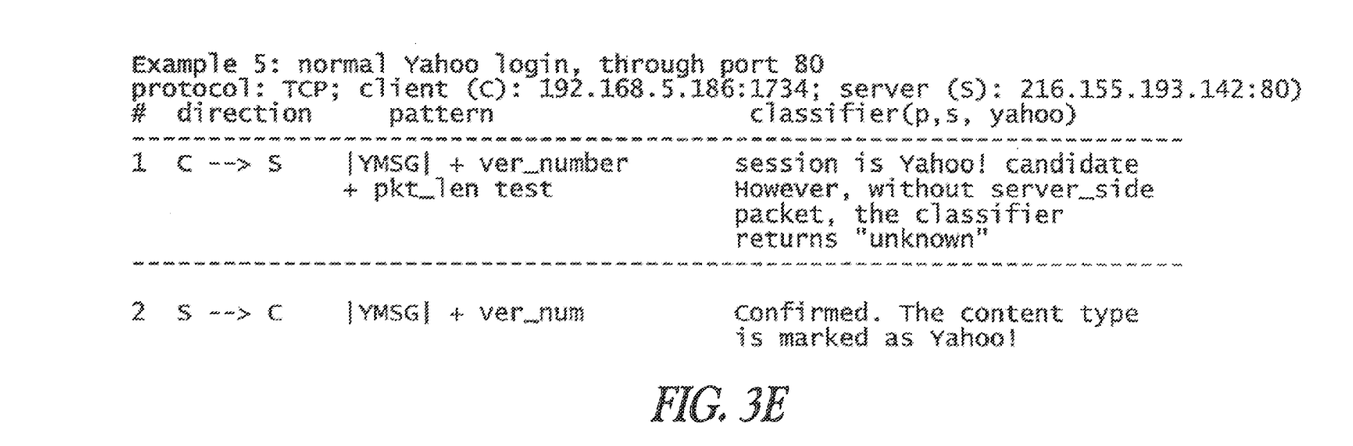

FIG. 3E illustrates an example of criteria that may be used to identify Yahoo! messenger traffic (through normal Yahoo login). In such cases, instead of determining a size of the packet, module 110 is configured to examine the content and string pattern. As shown in the example, two packets are used to determine that the traffic data is Yahoo! messenger traffic.

Figure 3F:
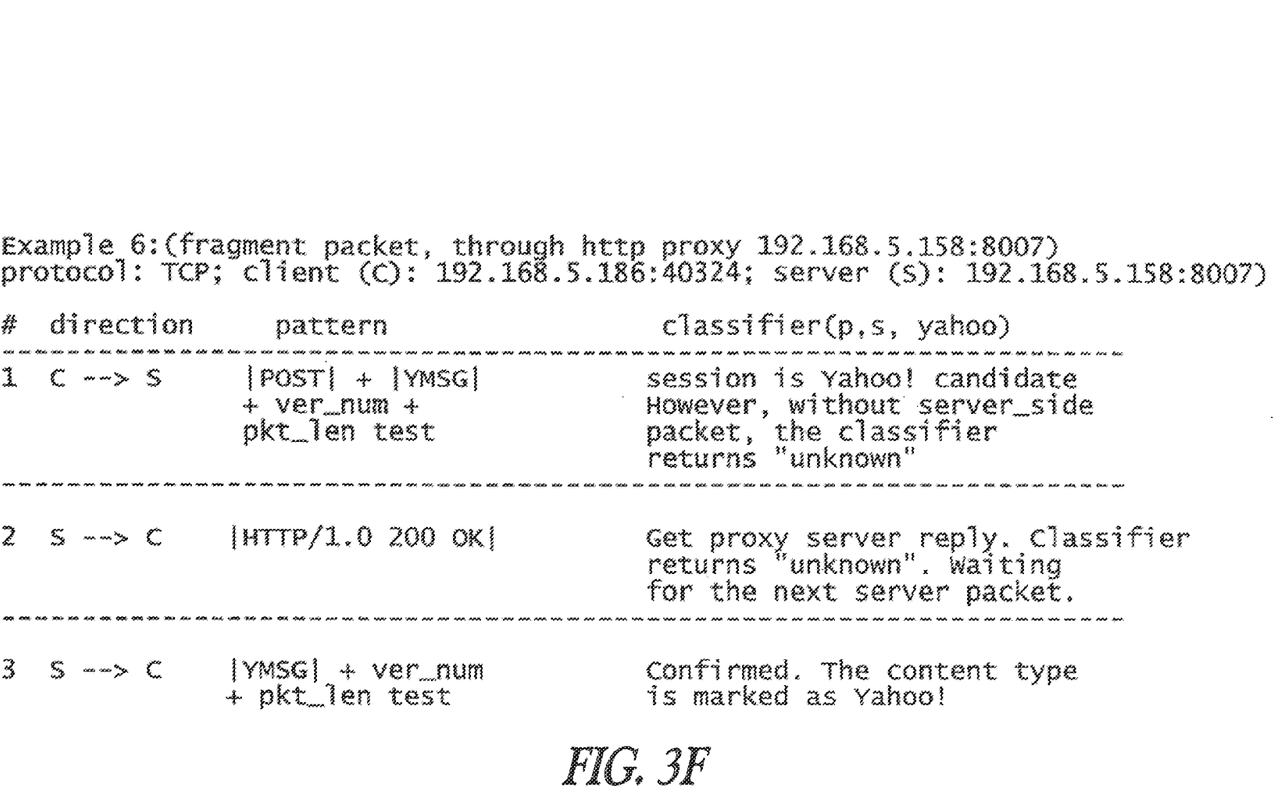

FIG. 3F illustrates an example of criteria that may be used to identify Yahoo! messenger traffic (through http proxy). As shown in the example, three packets are used to determine that the traffic data is Yahoo! messenger traffic.

Figure 3G:
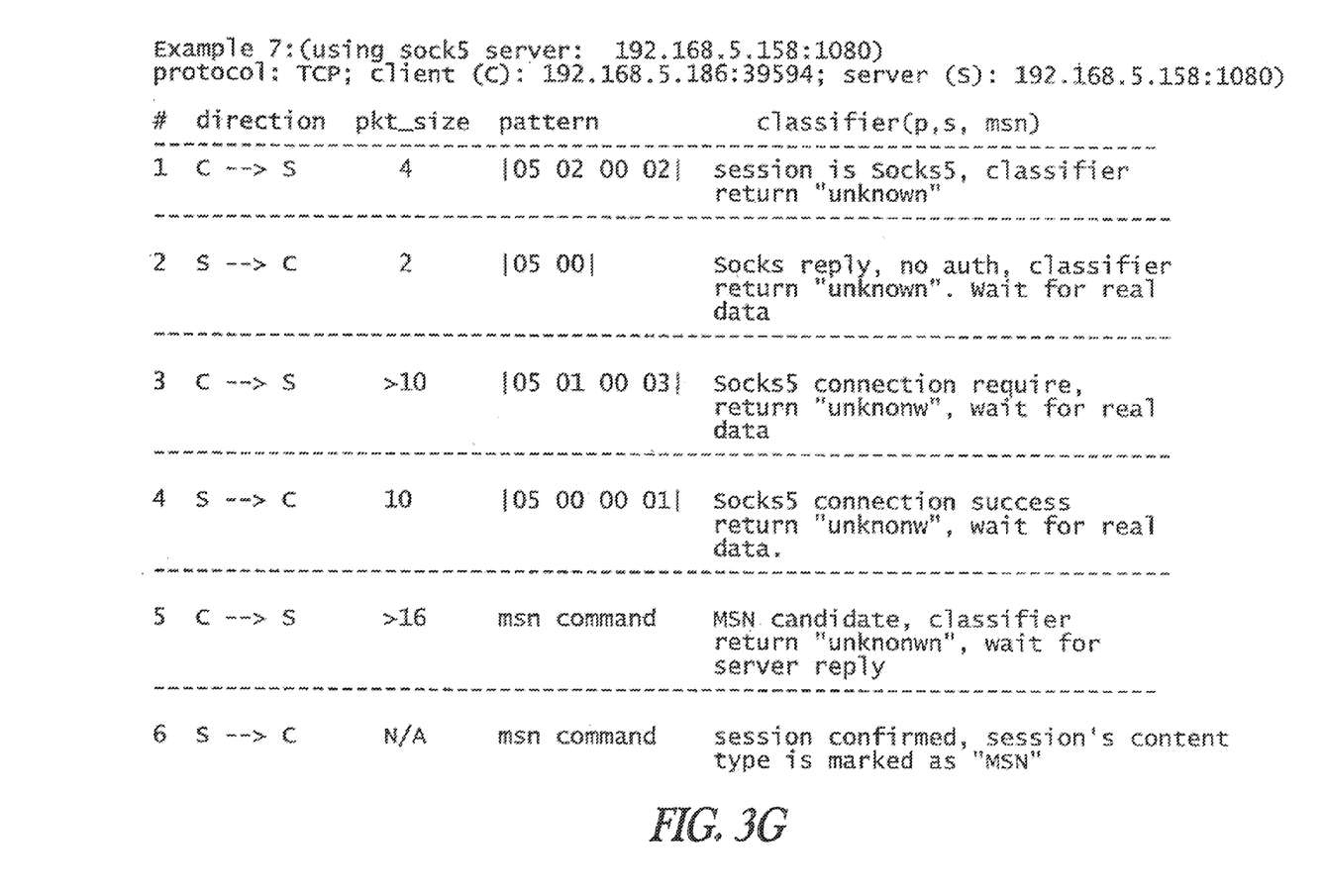

FIG. 3G illustrates an example of criteria that may be used to identify msn messenger. In such cases, module 110 is configured to examine payload size and pattern in the payload. As shown in the example, six packets are used to determine that the traffic data is msn messenger traffic.

Figure 3H:
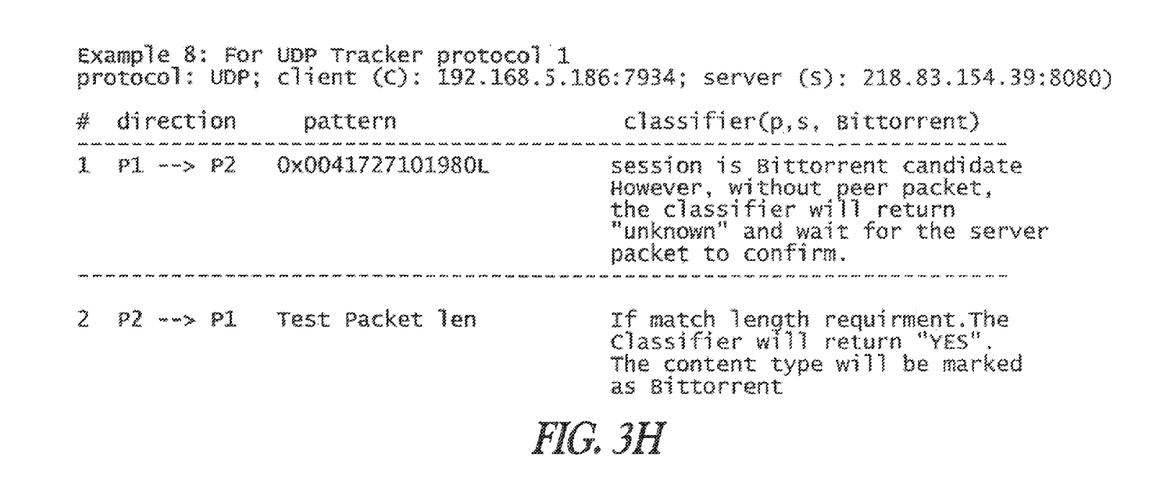

FIG. 3H illustrates an example of criteria that may be used to identify bittorrent data. As shown in the example, two packets are used to determine that the traffic data is bittorrent data.

Figure 3I:
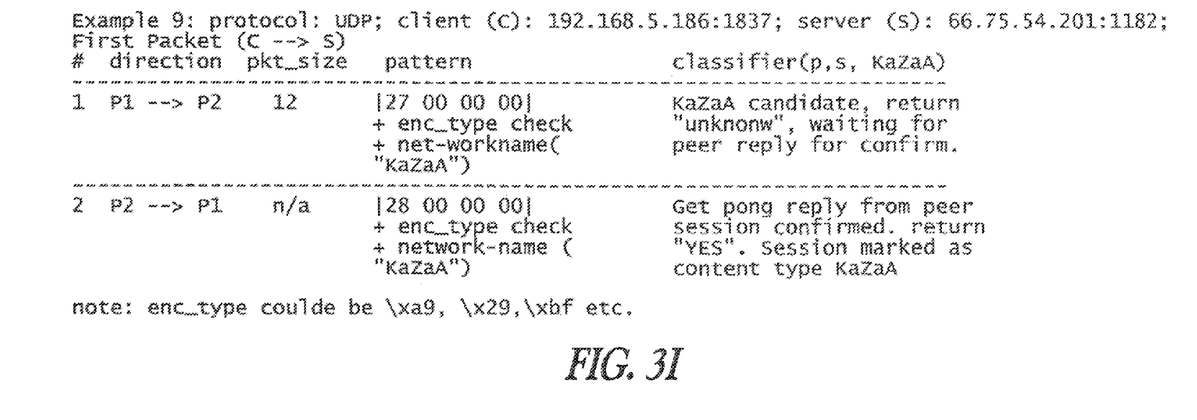

FIG. 3I illustrates an example of criteria that may be used to identify kazaa data. As shown in the example, two packets are used to determine that the traffic data is kazaa traffic.

As shown in the above example, examining more than one packets within a session is advantageous in that it greatly increases an accuracy, and eliminates false detection.

It should be noted that module 110 is not limited to using the examples of criteria described previously, and that module 110 can use other criteria for determining content type in other embodiments. In some embodiments, a user interface can be provided that allows an administrator to select criteria or parameters for determining content type. For example, module 110 can allow an administrator to input packet size, port number, prescribed string pattern, classifier, and other parameters that may be used to determine a content type. In some embodiments, the user interface also allows an administrator to create customized criteria to detect certain content type.

Figure 4:
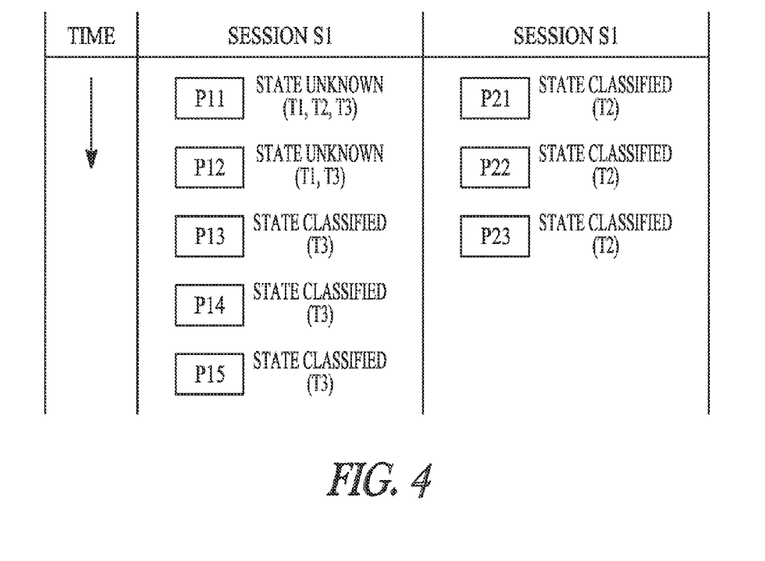
FIG. 4 illustrates examples of results obtained using the method of FIG. 2 in accordance with some embodiments.

FIG. 4 illustrates an example of results obtained using the process 200 of FIG. 2. After module 110 receives packet P11 (Step 202), module 110 determines that the packet P11 is associated with session S1 (Step 204). Packet P11 is the first packet in session S1, which has not been previously classified. Module 110 processes the packet P11 in an attempt to determine a content type (i.e., in an attempt to classify the session/packet) (Step 207). In the illustrated example, the analysis of packet P11 indicates that the packet P11 could be one of three content types T1, T2, and T3, and therefore, provides a result that is inconclusive. As a result, the content type of the session S1 remains "unknown" (i.e., the state of classification is "unknown" with T1, T2, and T3 being possible candidates).

Module 110 next receives another packet P12 (Step 202), and determines that the packet P12 is associated with the same session S1 (Step 204). Module 110 determines that the session S1 has not been classified (Step 205), and processes the packet P12 in an attempt to determine a content type (Step 207). In the illustrated example, the analysis of packet P12 indicates that data transmitted in session S1 does not belong to content type T2 (e.g., a packet size of P12 may not match a prescribed criteria for type T2), and is therefore, one of two remaining content types T1 and T3. Because the content type determination is inconclusive, the content type of the session S1 remains "unknown" (i.e., the state of classification is "unknown" with T1 and T3 being possible candidates).

Module 110 next receives another packet P13 (Step 202), and determines that the packet P13 is associated with the same session S1 (Step 204). Module 110 determines that the session S1 has not been classified (Step 205), and processes the packet P13 in an attempt to determine a content type (Step 207). In the illustrated example, the analysis of packet P13 indicates that data transmitted in session S1 is content type T3. As a result, module 110 classifies the session S1 (and therefore, its associated data) to be content type T3 (Step 208). In such cases, the state of classification for the session S1 is changed from "unknown" to "classified", with the classified content type being T3.

Module 110 next receives another packet P14 (Step 202), and determines that the packet P14 is associated with the same session S1 (Step 204). Module 110 determines that the session S1 has already been classified (Step 205), and therefore, classifies the packet P14 to be type T3 (Step 206). As shown in the example, after the session S1 has been classified, all subsequent received packets (e.g., packets P14 and P15) will be classified by module 110 to be type T3, and module 110 needs not analyze these subsequent packets (as in Step 207). In other embodiments, module 110 may be configured to check one or more additional packets after the session has been classified. This has the benefit of adding redundancy to the classification process to thereby prevent false classification.

In some cases, depending on the criteria used to determine a content type, module 110 may be able to classify a session using one packet. As shown in FIG. 4, after module 110 receives packet P21 (Step 202), module 110 determines that the packet P21 is associated with session S2 (Step 204). Because packet P21 is the first packet in session S2, session S2 has not been classified. Module 110 processes the packet P21 in an attempt to determine a content type (i.e., in an attempt to classify the session/packet) (Step 207). In the illustrated example, the analysis of packet P21 indicates that data transmitted in session S2 is content type T2. As a result, module 110 classifies the session S2 (and therefore, its associated data) to be content type T2 (Step 208). In such cases, the state of classification for the session S2 is changed from "unknown" to "classified", with the classified content type being T2.

Module 110 next receives another packet P22 (Step 202), and determines that the packet P22 is associated with the same session S2 (Step 204). Module 110 determines that the session S2 has already been classified (Step 205), and therefore, classifies the packet P22 to be type T2 (Step 206). As shown in the example, after the session S2 has been classified, all subsequent received packets (e.g., packets P22 and P23) will be classified by module 110 to be type T2, and module 110 needs not analyze these subsequent packets (as in Step 207). In other embodiments, module 110 may be configured to check one or more additional packets after the session has been classified. This has the benefit of adding redundancy to the classification process to thereby prevent false classification.

As shown in the above examples, after module 110 determines a content type for a session, any further packet(s) received in the same session will be classified as having the same content type (Step 206). As such, other than determining the session associated with the further packet(s), module 110 does not need to analyze these further packet(s). Such technique is advantageous in that later received packet(s) in the same session can be classified without consuming much resources. Also, as shown in the above examples, if module 110 determines that a session does not belong to a certain content type, then such content type will be eliminated as a potential candidate for the session. Such technique allows module 110 to classify the session more efficiently (because only remaining potential candidates are considered in subsequent processing).

In any of the embodiments described herein, module 110 may be configured to receive packets associated with more than one sessions (e.g., S1, S2). In such cases, module 110 may include a plurality of processing modules for processing packets that are associated with a same session.

Also, in some embodiments, module 110 may include a plurality of ports for receiving packets, wherein each port is configured to receive more than one type of data. An advantage of using the content type detection technique described herein is that module 110 can determine a content type by analyzing the packet(s) without using a port number of the port from which the packet(s) is received. This in turn, allows a port of the module 110 to receive more than one type of data. In other embodiments, one or more of the ports in the module 110 may be configured to receive one type of data. In such cases, the port assigned to receive one type of data can be used to receive data having a type that is relatively more difficult to detect by analyzing the packet. For example, if port R1 in module 110 is assigned to receive data having type T1, and port R2 is configured to receive data having any type, then data received from port R1 is automatically classified as type T1, while data received at port R2 will be processed using the method 200 of FIG. 2. In further embodiments, a port of the module 110 may be assigned to receive more than one prescribed type of data. For example, a port R3 of the module 110 may be assigned to receive data having types T2, T4, and T5. In such cases, data received at port R3 will be analyzed by module 110 using the process 200 of FIG. 2, with types T2, T4, and T5 being the possible candidates (e.g., other types, T1, T3 are automatically eliminated as possible candidates). Such technique has the benefit of improving the processing time of module 110.

In other embodiments, in addition to determining a content type for data being transmitted in a session, module 110 can be configured to further process the data based on the determined content type. For example, in some embodiments, module 110 may be configured to do content filtering, anti-virus detection, or other intrusion detection based on the determined content type. Many intrusion detection schemes requires that a content type be determined before applying certain intrusion detection algorithms. For example, if module 110 determines that received data belongs to content type T1, module 110 then applies intrusion detection algorithms A1, A3, and A4 to scan the data. On the other hand, if module 110 determines that received data belongs to content type T2, module 110 then applies intrusion detection algorithms A2, A4, and A6, for example.

Also, in further embodiments, in addition to determining a content type for data being transmitted in a session, module 110 can be configured to control flow of network traffic content based on the determined content type. For example, module 110 can be configured to block HTTP request, thereby preventing undesirable content, such as a web page containing undesirable content, from being transmitted to receiver 104. In other cases, module 110 may erase network traffic content, or modify network traffic content based on a determined characteristic of the network traffic content, such that only portion(s) of the content is allowed to pass to receiver 104. In one application, module 110 may be used to identify IM session or P2P session (which in traditional systems, can go to any port). In such cases, module 110 can establish a proxy for the IM session or P2P session, and monitor and/or control content of the session.

Computer Architecture

Figure 5:
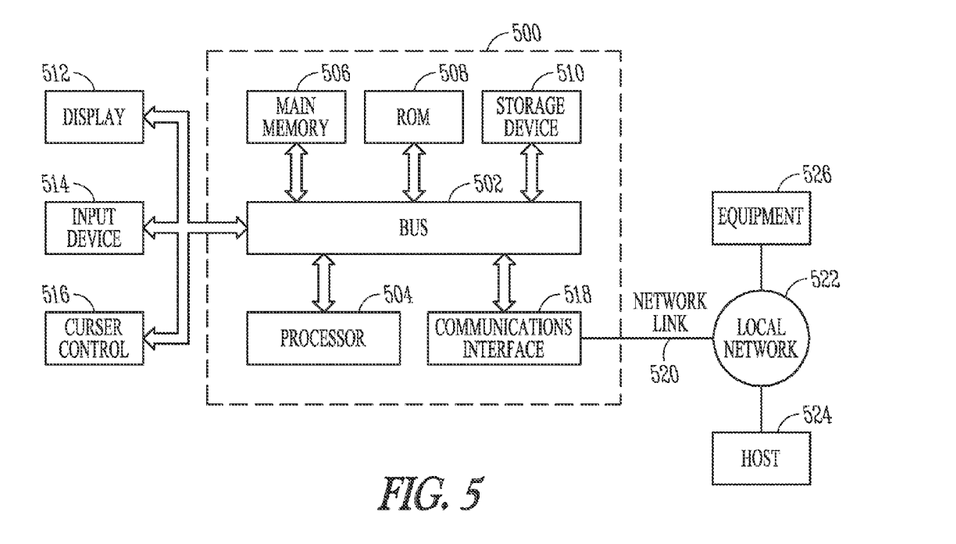
FIG. 5 is a diagram of a computer hardware system with which embodiments described herein can be implemented.

As described previously, module 110 can be implemented using software, hardware, or combination therefore. However, those skilled in the art understand that a computer system may also be used to implement module 110 to perform the functions described herein. FIG. 5 is a block diagram that illustrates an embodiment of a computer system 500 upon which embodiments of the method 200 may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 may further include a read only memory (ROM) 508 or other static storage device coupled to bus 502 for storing static information and instructions for processor 504. A data storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a user (e.g., receiver 104). An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 can be used for processing network traffic content. According to some embodiments, such use may be provided by computer system 500 in response to processor 504 executing one or more sequences of one or more instructions contained in the main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement embodiments described herein. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry data streams representing various types of information.

Network link 520 typically provides data communication through one or more networks to other devices. For example, network link 520 may provide a connection through local network 522 to a host computer 524. Network link 520 may also transmits data between an equipment 526 and communication interface 518. The data streams transported over the network link 520 can comprise electrical, electromagnetic or optical signals. The signals through the various networks and the signals on network link 520 and through communication interface 518, which carry data to and from computer system 500, are exemplary forms of carrier waves transporting the information. Computer system 500 can send messages and receive data, including program code, through the network (s), network link 520, and communication interface 518. Although one network link 520 is shown, in alternative embodiments, communication interface 518 can provide coupling to a plurality of network links, each of which connected to one or more local networks. In some embodiments, computer system 500 may receive data from one network, and transmit the data to another network. Computer system 500 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. For example, in other embodiments, one or more functions performed by module 110 may be implemented using one or more processors or one or more software. Also, in alternative embodiments, two or more of the steps of process 200 may be combined. In other embodiments, any of the steps of process 200 may be further broken down into sub-steps. In further embodiments, module 110 needs not perform all of the steps of process 200. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for determining a type of content, comprising:
   receiving a first packet of a session;
   determining an unknown state classification with regard to a potential classification for the session based on a determined unknown state classification with regard to the potential classification for the first packet;
   receiving a second packet of the session;
   determining a known state of classification with regard to the potential classification for the session based at least in part on the determined unknown state with regard to the potential classification for the first packet and on a determined known state classification with regard to the potential classification for the second packet; and
   wherein:
      the determined state of classification of the first packet further indicates that the first packet and the session have been determined not to be an other state of classification; and
      the state of classification for the second packet is determined by eliminating the other state of classification as a potential classification candidate for the second packet.

2. The method of claim 1, wherein the state classification of unknown indicates that a respective packet or session has not been dispositively ruled out as being of the potential classification.

3. The method of claim 2, wherein the determined state for the second packet is determined using the first and the second packets.

4. The method of claim 1, wherein the first packet is received from a port that is adapted for receiving at least two types of content.

5. A computer-readable storage medium, having a set of stored instructions, wherein execution of the stored instructions by one or more processors causes the one or more processors to:
   receiving a first packet of a session;
   determining an unknown state classification with regard to a potential classification for the session based on a determined unknown state classification with regard to the potential classification for the first packet;
   receiving a second packet of the session;
   determining a known state of classification with regard to the potential classification for the session based at least in part on the determined unknown state with regard to the potential classification for the first packet and on a determined known state classification with regard to the potential classification for the second packet; and
   wherein:
      the determined state of classification of the first packet further indicates that the first packet and the session have been determined not to be an other state of classification; and
      the state of classification for the second packet is determined by eliminating the other state of classification as a potential classification candidate for the second packet.

6. A system comprising:
   a processor coupled to a bus;
   at least one memory device coupled to the bus;
   a network communication interface coupled to the bus;
   a network data classification module, stored in the at least one memory device and executable by the processor to classify content of network traffic sessions, the network data classification module, when executed, operable to:
      receive, from a network over the network communication interface, a first packet of a session;
      determine an unknown state classification with regard to a potential classification for the session based on a determined unknown state classification with regard to the potential classification for the first packet;
      receive a second packet of the session;
      determine a known state of classification with regard to the potential classification for the session based at least in part on the determined unknown state with regard to the potential classification for the first packet and on a determined known state classification with regard to the potential classification for the second packet; and
   wherein:
      the determined state of classification of the first packet further indicates that the first packet and the session have been determined not to be an other state of classification; and
      the state of classification for the second packet is determined by eliminating the other state of classification as a potential classification candidate for the second packet.

* * * * *

UNITED STATES PATENT AND TRADEMARK OFFICE
CERTIFICATE OF CORRECTION

PATENT NO. : 7,580,974 B2  Page 1 of 1
APPLICATION NO. : 11/357654
DATED : August 25, 2009
INVENTOR(S) : Wei et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 647 days.

Signed and Sealed this

Fourteenth Day of September, 2010

David J. Kappos
*Director of the United States Patent and Trademark Office*